US005948492A

United States Patent [19]
Cargile

[11] Patent Number: 5,948,492
[45] Date of Patent: Sep. 7, 1999

[54] COST-EFFECTIVE ENVIRONMENTALLY-FRIENDLY BLOW-MOLDED PLASTIC CONTAINER

[75] Inventor: David W. Cargile, Lititz, Pa.

[73] Assignee: Graham Packaging Company, L.P., York, Pa.

[21] Appl. No.: 08/780,792

[22] Filed: Jan. 9, 1997

[51] Int. Cl.⁶ .............................. B29D 1/00; B29D 22/00
[52] U.S. Cl. ..................... 428/36.4; 206/508; 428/36.5; 428/36.92; 521/92; 521/143
[58] Field of Search ................... 428/35.7, 36.92, 428/36.91, 36.5, 36.4; 521/79; 264/54; 524/425

[56] References Cited

U.S. PATENT DOCUMENTS

| Re. 35,447 | 2/1997 | Garcia et al. ........................... 252/350 |
|---|---|---|
| 2,849,028 | 8/1958 | Clark et al. ............................. 428/36.5 |
| 3,203,921 | 8/1965 | Rosenfelder ........................... 260/33.6 |
| 3,362,924 | 1/1968 | Eastman . |
| 3,725,336 | 4/1973 | Susuki et al. . |
| 3,962,154 | 6/1976 | Egli ......................................... 260/2.5 |
| 3,969,314 | 7/1976 | Grigull . |
| 3,976,612 | 8/1976 | Kaji et al. . |
| 4,165,302 | 8/1979 | Armenti et al. . |
| 4,174,340 | 11/1979 | Lüders et al. . |
| 4,244,933 | 1/1981 | Shibazaki et al. . |
| 4,279,661 | 7/1981 | Strauch et al. . |
| 4,522,675 | 6/1985 | Sharps ............................... 156/244.11 |
| 4,526,823 | 7/1985 | Farrell et al. . |
| 4,567,069 | 1/1986 | Habarin ..................................... 428/35 |
| 4,626,456 | 12/1986 | Farrell et al. . |
| 4,629,596 | 12/1986 | Coffman . |
| 4,835,195 | 5/1989 | Rayfield et al. . |
| 5,037,580 | 8/1991 | Garcia et al. ............................ 252/350 |
| 5,100,930 | 3/1992 | Fukui et al. ............................. 523/100 |
| 5,102,465 | 4/1992 | Lamond . |
| 5,164,258 | 11/1992 | Shida et al. ........................... 428/319.3 |
| 5,302,455 | 4/1994 | Wason et al. ........................... 428/403 |
| 5,352,500 | 10/1994 | Memon .................................. 428/35.7 |
| 5,371,132 | 12/1994 | Ebara et al. . |
| 5,650,224 | 7/1997 | March et al. ........................... 428/297 |

FOREIGN PATENT DOCUMENTS

| 402153944 | 6/1990 | Japan . |
| WO 96/09341 | 3/1996 | WIPO . |

OTHER PUBLICATIONS

One page document, *Hydrocel CF 20 E* by B.I. Chemicals, Inc.—Henley Division.
multi–page brochure, *Boehringer Ingelheim Your Partner for Foamed Plastics Hydrocel.*
Vol. 4, 3rd Edition, Kirk–Othmer Encyclopedia of Chemical Technology, *Blood, Coagulants and ANticoagulants to Cardiovascular Agents.*

*Primary Examiner*—Ellis Robinson
*Assistant Examiner*—Sandra M. Nolan
*Attorney, Agent, or Firm*—Howson and Howson

[57] ABSTRACT

A blow-molded plastic container manufactured from a homogenous mixture of a plastic resin, a calcium carbonate filler, and a blowing agent in specified amounts. The filler reduces the overall material costs, and the blowing agent reduces the specific gravity of the mixture to enable the container to be recycled utilizing existing floatation tank recycling equipment.

1 Claim, 1 Drawing Sheet

COST-EFFECTIVE ENVIRONMENTALLY-FRIENDLY BLOW-MOLDED PLASTIC CONTAINER

FIELD OF THE INVENTION

The present invention relates to a blow-molded plastic container manufactured from a filled-thermoplastic composition, and more particularly, the present invention relates to an environmentally friendly blow-molded plastic container which can be readily recycled utilizing known floatation tank techniques.

BACKGROUND OF THE INVENTION

Containers manufactured from plastic resins are used in many industries in the packaging of goods. For instance, plastic containers are used to package automotive fluids such as motor oil, household products such as detergent, and other liquid, granular or gel products. Such containers are manufactured efficiently utilizing blow-molding techniques and can be made from various resins such as, for example, high density polyethylene (HDPE). Because of the widespread use of blow-molded plastic containers, cost saving and environmental related improvements to the manufacture of blow-molded plastic containers are of great significance to the packaging industry.

According to the *Encyclopedia of Chemical Technology*, third edition, volume 4, it is conventional to utilize calcium carbonate as a filler in various products to reduce material costs and improve specific qualities of the products such as heat resistance, dimensional stability, stiffness, hardness, and processability. The referenced encyclopedia suggests the use of calcium carbonate as a filler in paper, paint, plastics, rubber, textiles, putties, caulks, sealants, adhesives and printing ink.

U.S. Pat. No. 3,969,314 issued to Grigull discloses the use of fillers with plastic resins "to improve stability, to make the raw material less expensive and to achieve high heat resistance." See Column 1, lines 9–11. The patent also discloses the use of a talcum, or chalk, filler in a plastic resin to manufacture blown hollow bodies such as containers for detergent. At column 2, line 60, the Grigull patent discloses a "particularly advisable" mixing ratio for chalk and talcum fillers of between 30% to 40% filler to 70% to 60% plastic resin.

Other patents also disclose the use of calcium carbonate as a filler in plastic resins to produce various products and to accomplish various purposes. For example, see U.S. Pat. Nos. 4,526,823 and 4,626,456 issued to Farrell et al.; 4,629,596 issued to Coffman; 4,165,302 issued to Armenti et al.; 3,725,336 issued to Susuki et al.; 4,174,340 issued to Luders et al.; 3,203,921 issued to Rosenfelder; 3,976,612 issued to Kaji et al.; 3,362,924 issued to Eastman; 5,371,132 issued to Ebara et al.; 5,102,465 issued to Lamond; 4,835,195 issued to Rayfield et al.; 4,244,933 issued to Shibazaki et al.; and 4,279,661 issued to Strauch et al.

While the cost of manufacturing a plastic blow-molded container is one concern, another important concern is whether or not the container can be readily recycled. High density polyethylene (HDPE) has a specific gravity of 0.956, and therefore, floats on water for ready recovery by existing floatation tank recycling equipment. Another commonly used plastic resin for manufacturing blow-molded containers is polypropylene (PP) which has a specific gravity of 0.90 and also can be readily recycled using floatation tank equipment.

A problem with the use of calcium carbonate as a filler in plastic blow-molded containers is that such containers cannot be readily recycled using existing floatation tank recycling equipment. Calcium carbonate has a specific gravity of 1.4. Thus, a mixture of calcium carbonate filler and one of the above referenced plastic resins will have a combined specific gravity of above 1. For example, a mixture of: 85% HDPE and 15% calcium carbonate has a specific gravity of 1.004; 70% HDPE and 30% calcium carbonate has a specific gravity of 1.154; 50% HDPE and 50% calcium carbonate has a specific gravity of 1.364; 85% PP and 15% calcium carbonate has a specific gravity of 1.042; 70% PP and 30% calcium carbonate has a specific gravity of 1.126; and 50% PP and 50% calcium carbonate has a specific gravity of 1.362. Articles formed from such compositions will sink in the floatation tanks, and therefore, cannot be readily recycled utilizing existing floatation tank recycling equipment.

Although the blown container disclosed in the Grigull patent may function satisfactorily for its intended purpose, there is a need for an environmentally friendly blow-molded plastic container which is manufactured from a mixture of plastic resin and a finely divided mineral filler, such as calcium carbonate, to achieve cost efficiency. The container should be capable of being readily recycled using existing floatation tank equipment.

OBJECTS OF THE INVENTION

With the foregoing in mind, a primary object of the present invention is to provide a blow-molded plastic container which is manufactured from a novel composition.

Another object of the present invention is to provide an improved blow-molded plastic container which can be readily recycled utilizing existing floatation tank equipment.

A further object is to provide a unique blow-molded filled-plastic container which is relatively strong, which is inexpensive from a materials standpoint, and which enables manufacturing economies to be realized.

SUMMARY OF THE INVENTION

More specifically, the present invention provides a blow-molded plastic container manufactured from a homogenous composition comprising a thermoplastic resin, a finely divided mineral filler and a blowing agent. The use of the blowing agent provides the composition with a specific gravity of less than about unity so that the blow-molded plastic container can be recycled in floatation tank equipment. Preferably, the mineral filler is calcium carbonate and is present in a range of about 15% to about 30% by weight of the total weight of the composition, and the blowing agent is in a range of about 0.25% to about 2.0% by weight of the total weight of the composition, the balance being thermoplastic resin.

BRIEF DESCRIPTION OF THE DRAWINGS

The foregoing and other objects, features and advantages of the present invention should become apparent from the following description when taken in conjunction with the accompanying drawing, in which.

DETAILED DESCRIPTION OF THE PREFERRED EMBODIMENT

Figure 1:
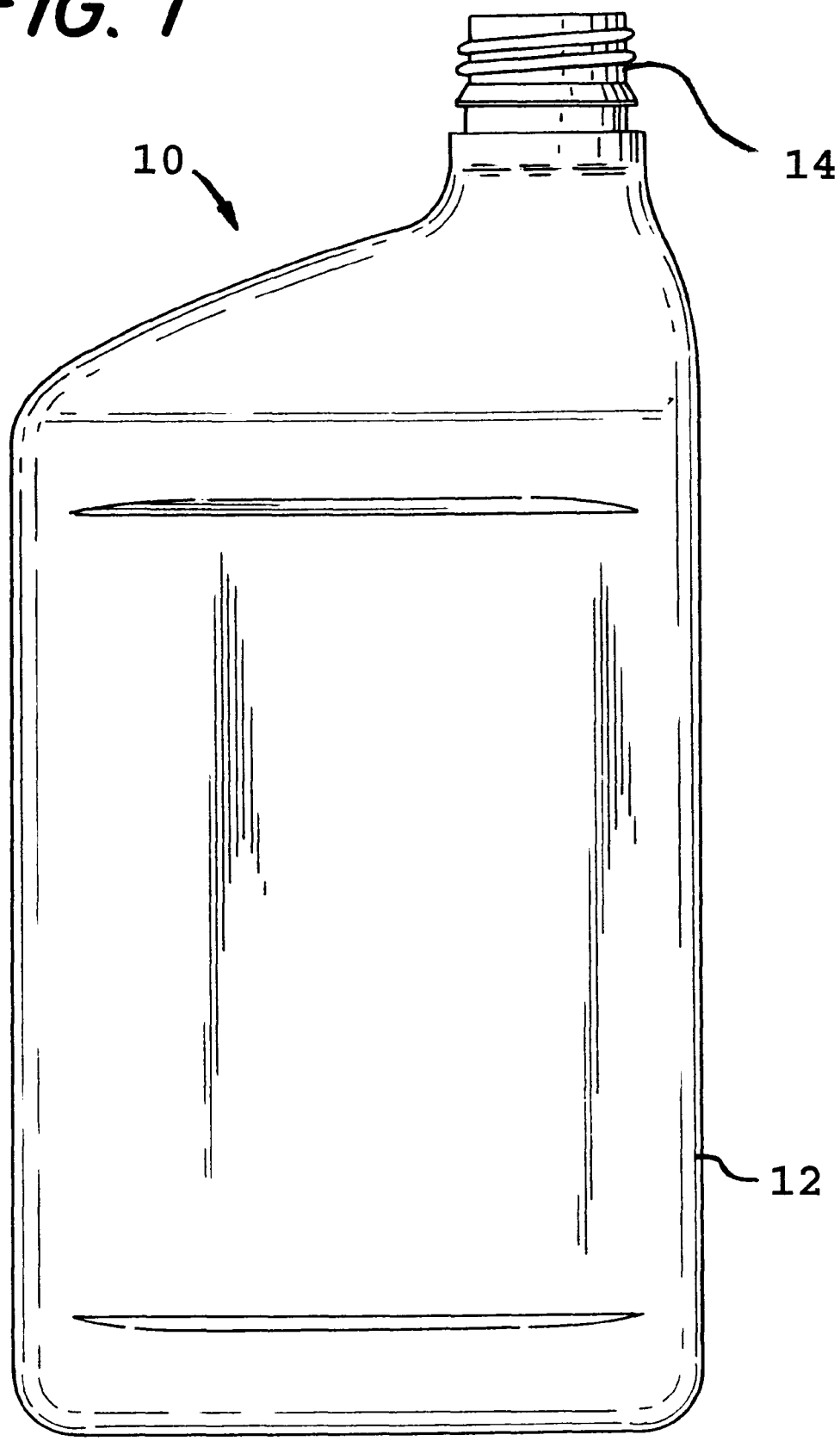
FIG. 1 is a front elevational view of a container embodying the present invention.

A blow-molded plastic container 10 of the present invention can be used to package a variety of products, including automotive fluids such as motor oil. The container 10 has a sidewall 12 and a threaded finish 14 capable of being sealed by a closure (not shown). The container 10 is made from a single layer of a homogenous composition which comprises a thermoplastic resin and a finely divided mineral filler, such as calcium carbonate. The mineral filler is less expensive than the plastic resin thereby achieving an overall cost savings by replacing a given amount of thermoplastic resin with the mineral filler. For example, instead of manufacturing the container 10 from about 51 grams of HDPE, according to the present invention, it could be manufactured from about 43 grams of HDPE and about 8 grams of calcium carbonate filler. However, as mentioned earlier, a container made solely from a thermoplastic resin and a calcium carbonate filler cannot be readily recycled in existing floatation tank recycling equipment.

A novel feature of the present invention is the addition of a blowing, or foaming, agent to the mixture to provide a homogenous mixture with an overall specific gravity of below about 1.0. Thus, the mixture of thermoplastic resin, mineral filler, and blowing agent provides an overall material cost savings compared with a pure thermoplastic resin container, and it can be readily recycled using existing floatation tank equipment.

A preferred mixture is about 0.25% to 2.0% by weight of blowing agent, 15% to 30% by weight of calcium carbonate filler, and the balance being a thermoplastic resin. The thermoplastic resin is preferably either high density polyethylene (HDPE) or polypropylene (PP). An example of a preferred blowing agent is HYDROCEL CF 20 E chemical blowing and nucleating agent sold by B.I. Chemicals, Inc. of Montvale, N.J.

The blowing agent reduces the density of the thermoplastic resin and calcium carbonate mixture provided that during the manufacturing process of the container 10, the blowing agent's decomposition temperature is reached. Testing has shown that the addition of the blowing agent in an amount less than about 0.25% by weight of the total weight of the composition will result in the composition having a specific gravity of above unity. Testing has also shown that the addition of the blowing agent in an amount greater than about 2.0% will result in a composition of insufficient density. A container made from such a composition has insufficient top loading capability and a proclivity to become unintentionally distorted during filling and shipping operations. Therefore, the preferred range of the blowing agent is between about 0.25% to 2.0% by weight in order to provide a sturdy and readily recyclable container.

The mineral filler should be of a sufficient amount to provide a significant material savings. However, the amount of mineral filler in the composition should not increase the specific gravity of the composition above unity. In addition, testing has shown that a container having above a certain percentage of mineral filler will not provide sufficient top loading capability. The range of calcium carbonate filler between about 15% to about 30% by weight of the total weight of the composition provides a significant savings and a readily recyclable and sturdy container.

The above described homogenous mixture can be used to manufacture one-layer, blow-molded containers having many advantages over similarly manufactured containers of pure thermoplastic resin.

As mentioned above, a direct material cost savings is achieved by using the relatively less expensive mineral filler. The specific gravity of the mixture is less than about one so that it can be recycled with floatation tank equipment.

The calcium carbonate filler decreases the melt temperature of the blown container, enabling the rate of production of the container to be increased relative to the same container made from pure thermoplastic resin. Alternatively, instead of increasing the rate of production, the process temperatures can be lowered to achieve a savings in energy costs relative to processes utilizing pure thermoplastic resins.

In a color-dyed container, the calcium carbonate filler promotes better dye dispersion throughout the mixture so that the amount of dye can be reduced.

Top loading and drop tests have shown that the above preferred mixture provides a structurally sound container. The container 10 made in accordance with the present invention has been shown to possess a top loading capability within 10% of the top loading capability of a similar structured container made from 100% of pure thermoplastic resin.

Preferably, the calcium carbonate and blowing agent is pre-mixed with the thermoplastic resin by the resin supplier.

While a preferred container composition has been described in detail, various modifications, alterations, and changes may be made without departing from the spirit and scope of the present invention as defined in the appended claims.

I claim:

1. A container comprising:

a body having a single layer sidewall and an upstanding threaded finish capable of being sealed for packaging fluent products;

the container being formed by blow-molding from a homogenous composition consisting essentially of between about 15% to about 30% by weight of a calcium carbonate filler and between about 0.25% to about 2.0% by weight of a blowing agent, the balance being a thermoplastic resin, said weight percentage being based on the total weight of the composition;

said composition having a specific gravity of less than about unity so that the container is capable of being recycled by conventional floatation tank technique; and said container having a top loading capability within 10.0 percent of an identical container made from a composition consisting of the same thermoplastic resin forming said balance.

* * * * *